(12) United States Patent
Peng et al.

(10) Patent No.: US 7,490,810 B2
(45) Date of Patent: Feb. 17, 2009

(54) MOUNTING APPARATUS FOR STORAGE DEVICE

(75) Inventors: Wen-Tang Peng, Taipei Hsien (TW); Jun-Xiong Zhang, Shenzhen (CN); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/672,961

(22) Filed: Feb. 9, 2007

(65) Prior Publication Data

US 2008/0013271 A1     Jan. 17, 2008

(30) Foreign Application Priority Data

Jun. 9, 2006     (CN) ......................... 2006 1 0061080

(51) Int. Cl.
*F16M 11/00* (2006.01)
(52) U.S. Cl. ...................... 248/694; 248/200
(58) Field of Classification Search ................ 248/694, 248/27.1, 27.3, 200; 361/684, 685, 97.01, 361/724; 312/223.1
See application file for complete search history.

(56) References Cited

U.S. PATENT DOCUMENTS

| | | | |
|---|---|---|---|
| 6,373,695 B1 * | 4/2002 | Cheng | 361/685 |
| 6,590,775 B2 * | 7/2003 | Chen | 361/725 |
| 6,651,936 B2 * | 11/2003 | Upson et al. | 248/27.3 |
| 6,853,549 B2 * | 2/2005 | Xu | 361/685 |
| 7,259,960 B2 * | 8/2007 | Hua et al. | 361/685 |
| 2005/0116135 A1 * | 6/2005 | Peng et al. | 248/694 |
| 2005/0190535 A1 * | 9/2005 | Peng et al. | 361/685 |
| 2007/0164170 A1 * | 7/2007 | Huang et al. | 248/27.1 |
| 2007/0235625 A1 * | 10/2007 | Liang et al. | 248/675 |
| 2008/0000849 A1 * | 1/2008 | Zhang et al. | 211/26.2 |

\* cited by examiner

*Primary Examiner*—Ramon O Ramirez
(74) *Attorney, Agent, or Firm*—Wei Te Chung

(57) ABSTRACT

A mounting apparatus includes a bracket for receiving a storage device, and a latching member carried on the storage device. The bracket includes a first sidewall defining a slot therein. A stop plate is formed at an end of the first sidewall adjacent the slot. The latching member includes a resilient plate and a hooking portion. The resilient plate is receivable in the slot in the first sidewall of the bracket and movable relative to the storage device. The resilient plate has a protrusion formed thereon and engagable with the stop plate of the bracket for positioning the latching member in a first direction. The hooking portion is capable of engaging with a portion of the bracket bounding the slot thereof for positioning the latching member in a second direction opposite to the first direction.

19 Claims, 4 Drawing Sheets

MOUNTING APPARATUS FOR STORAGE DEVICE

BACKGROUND OF THE INVENTION

1. Field of the Invention

The present invention relates to mounting apparatuses, and more particularly to a mounting apparatus for a storage device.

2. Description of Related Art

An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is labor-intensive.

The installation of a hard disk drive in a computer typically involves the use of screws to attach the hard disk drive to a bracket of a computer chassis. However, these screws are usually too small and difficult to handle. Additionally, because of their small size, the screws are easily dropped, by an assembler, into the computer.

To address the aforementioned problems, a plurality of mounting apparatuses is invented to reduce the number of needed screws. For example, a pair of detachable rails is attached to opposite sides of a storage device with screws. The storage device is then slid into and secured to a drive bracket. However, the screws have to be removed to detach the rails from the storage device before replacing the storage device.

What is needed, therefore, is a mounting apparatus which facilitates convenient and secure mounting of a storage device in a bracket.

SUMMARY OF THE INVENTION

An exemplary mounting apparatus includes a bracket for receiving a storage device, and a latching member carried on the storage device. The bracket includes a first sidewall defining a slot therein. A stop plate is formed at an end of the first sidewall adjacent the slot. The latching member includes a resilient plate and a hooking portion. The resilient plate is receivable in the slot in the first sidewall of the bracket and movable relative to the storage device. The resilient plate has a protrusion formed thereon and engagable with the stop plate of the bracket for positioning the latching member in a first direction. The hooking portion is capable of engaging with a portion of the bracket bounding the slot thereof for positioning the latching member in a second direction opposite to the first direction.

Other advantages and novel features will become more apparent from the following detailed description of preferred embodiment when taken in conjunction with the accompanying drawings, in which:

DETAILED DESCRIPTION OF THE INVENTION

Figure 1:
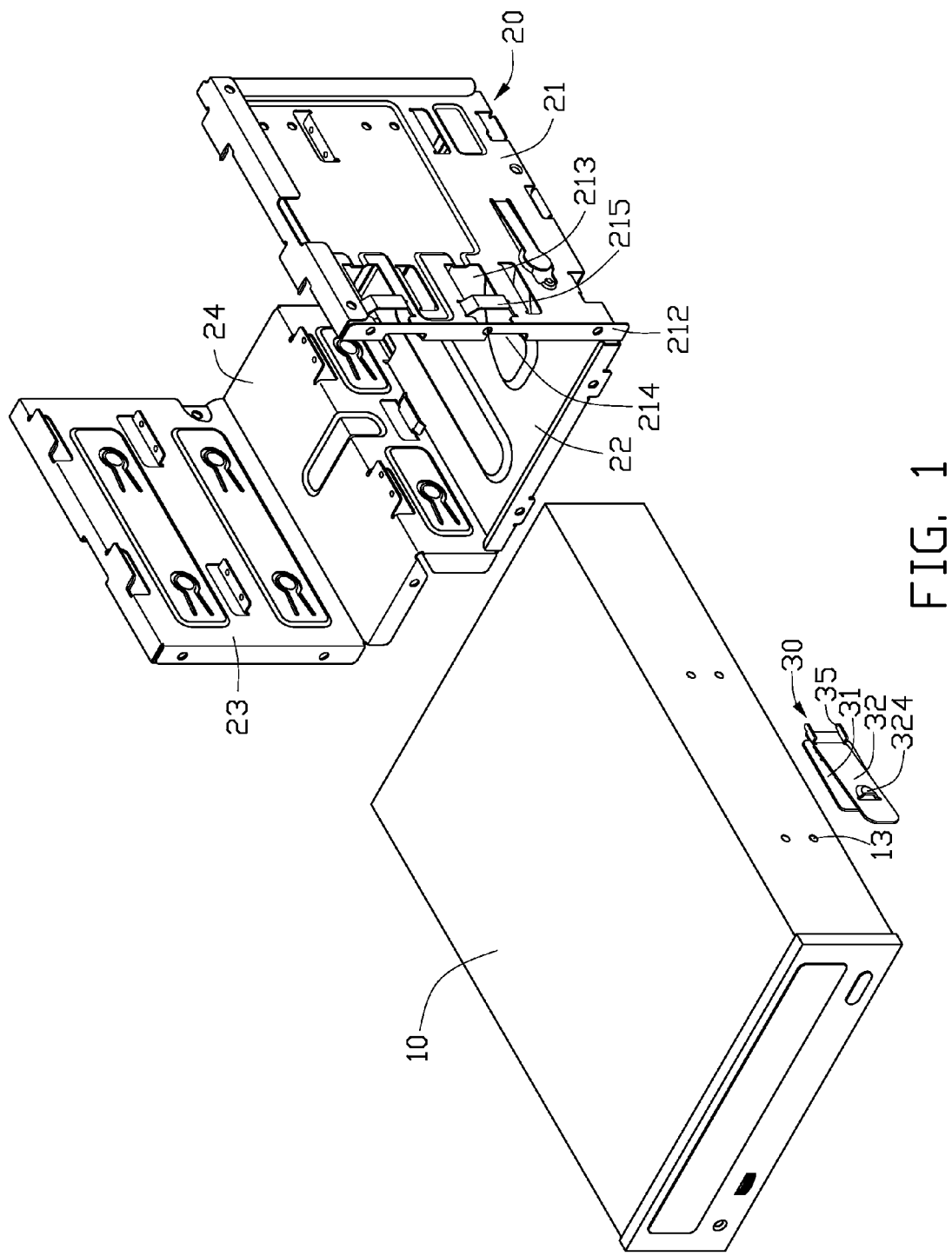
FIG. 1 is an exploded, isometric view of a mounting apparatus with a storage device in accordance with a preferred embodiment of the present invention, the mounting apparatus including a bracket, and a latching member.

Referring to FIG. 1, a mounting apparatus for a storage device is provided in accordance with a preferred embodiment of the present invention. The mounting apparatus includes a bracket 20 for receiving a storage device 10, and a latching member 30 for fixing the storage device 10 to the bracket 20. The storage device 10 defines a pair of fixing holes 13 in a lateral side thereof.

The bracket 20 includes a first sidewall 21, a second sidewall 23, and a bottom wall 22. An L-shaped supporting portion 24 is formed connecting with the second sidewall 23 and the bottom wall 22, and two support plates (not labeled) are formed on an inside surface of the first sidewall 21 parallel with the bottom wall 22, for supporting the storage device 10 in cooperation with a horizontal section of the supporting portion 24. Two openings are defined in two ends of the bracket 20 respectively. One of the openings acts as an entrance for the storage device 10 entering the bracket 20, and a stop plate 212 is bent outwardly from an end of the first sidewall 21 adjacent the entrance. A slot 213 is defined in the first sidewall 21 over the support plates and adjoining the stop plate 212. A notch 214 is defined in the stop plate 212 communicating with the slot 213. A bridge 215 is formed on an outside surface of the first sidewall 21 across the slot 213 and adjacent the stop plate 212.

Figure 2:
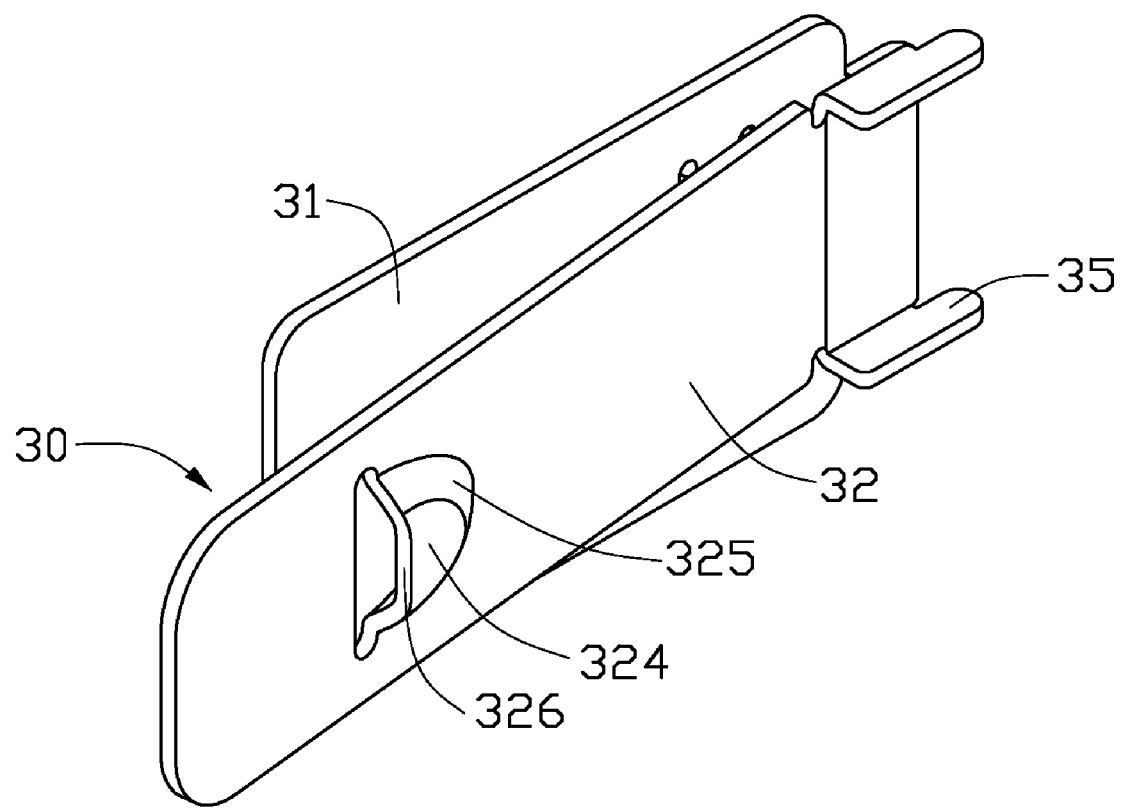
FIG. 2 is an enlarged isometric view of the latching member of FIG. 1.
Figure 3:
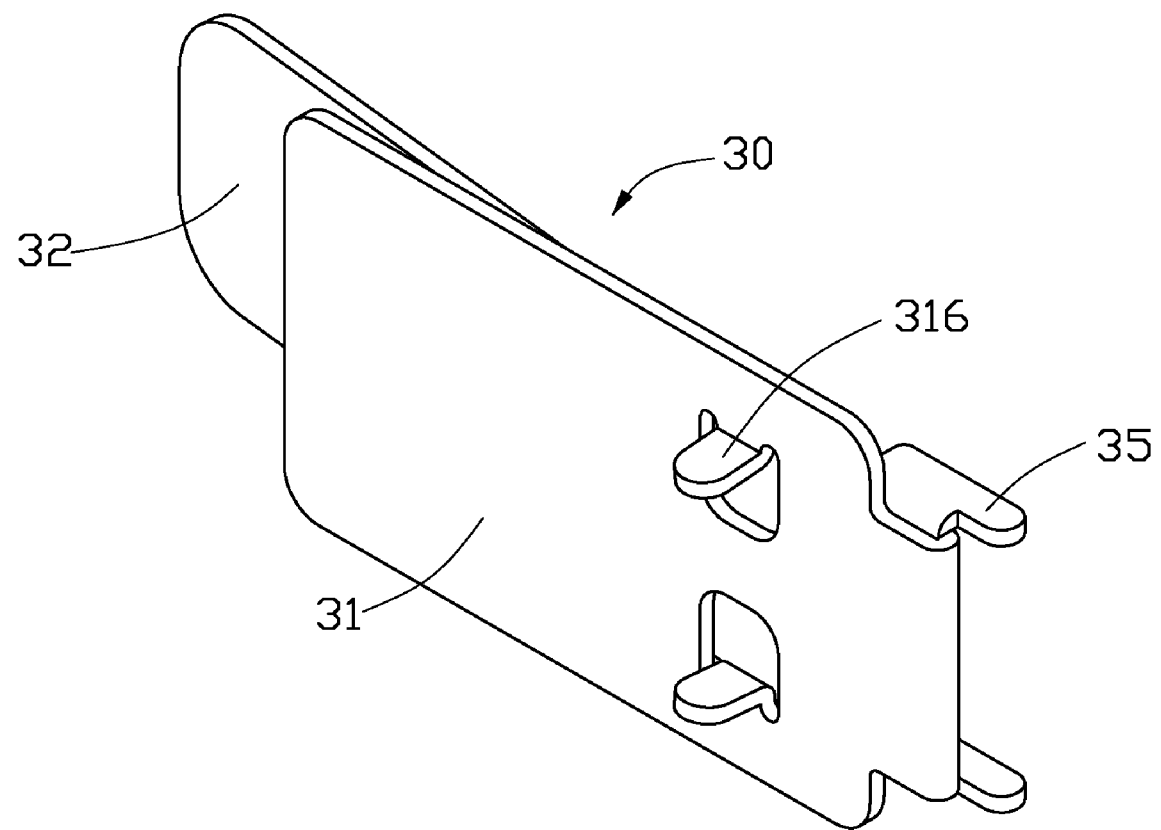
FIG. 3 is similar to FIG. 2, but viewed from another aspect.

Referring also to FIGS. 2 and 3, the latching member 30 is generally V-shaped. The latching member 30 includes a fixing plate 31, and a resilient plate 32 bent from a rear end of the fixing plate 31. The fixing plate 31 and the resilient plate 32 cooperatively form an acute angle therebetween. Two hooking portions 35 extend rearward from a portion where the fixing plate 31 and the resilient plate 32 are joined. Two spaced tabs 316 are punched outward from the fixing plate 31, corresponding to the fixing holes 13 of the storage device 10. A protrusion 324 having an arcuate surface 325 is formed on the resilient plate 32 adjacent a free end thereof, for facilitating the protrusion 324 passing through the notch 214 of the stop plate 212. An engaging portion 326 is formed on the protrusion 324 toward the free end of the resilient plate 32.

Figure 4:
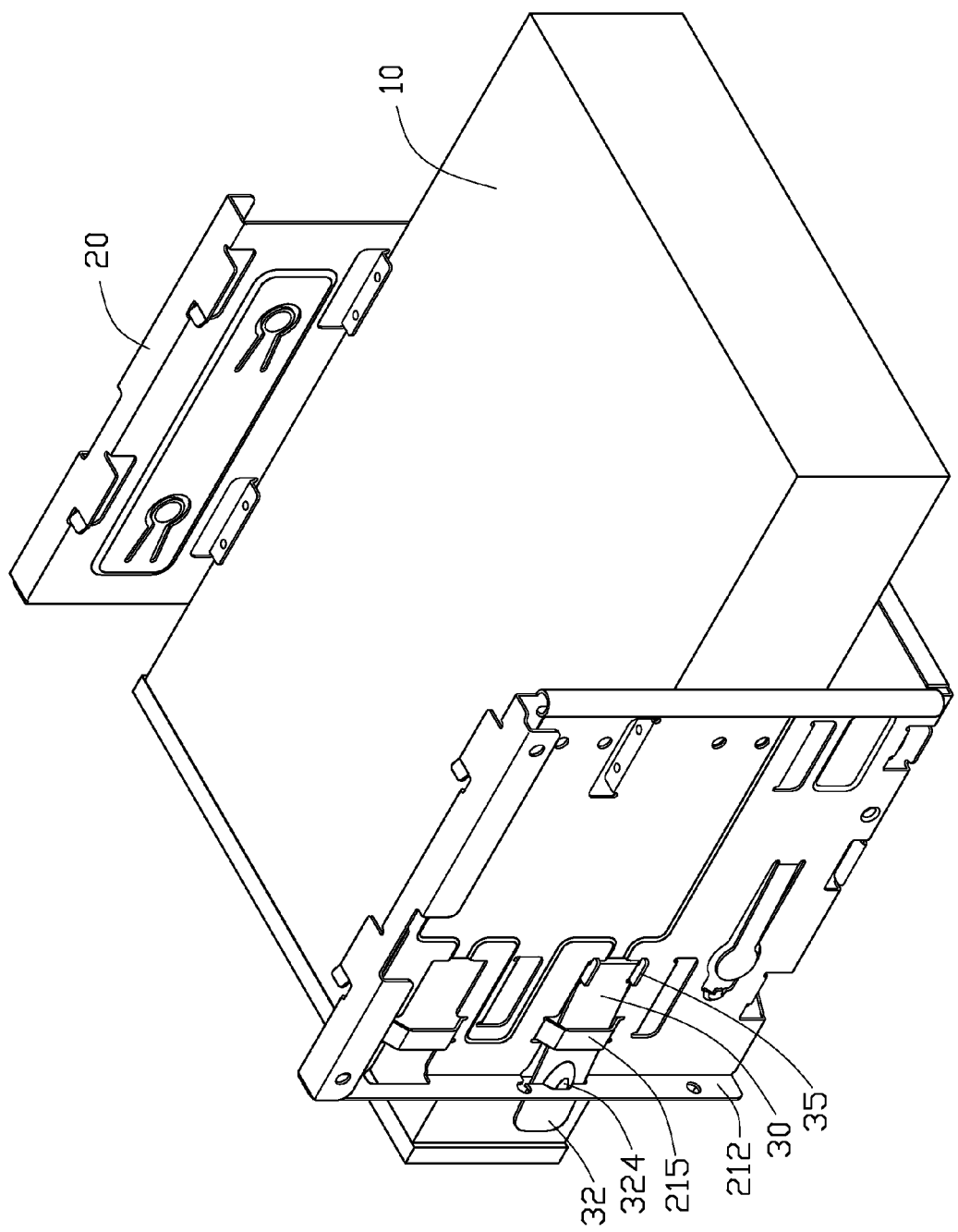
FIG. 4 is an assembled view of FIG. 1.

Referring further to FIG. 4, in assembly, the tabs 316 of the fixing plate 31 of the latching member 30 are inserted into the corresponding fixing holes 13 of the storage device 10. Thereby, the latching member 30 is mounted on the storage device 10. The combined storage device 10 and the latching member 30 are inserted in the bracket 20 along the supporting portion 24 and the support plates of the bracket 20 via the entrance. The latching member 30 mounted on the storage device 10 aligns with the notch 214 of the stop plate 212 and the slot 213 of the first sidewall 21 of the bracket 20. When the arcuate surface 325 of the protrusion 324 of the latching member 30 abuts against the stop plate 212, the resilient plate 32 is pressed to move toward the fixing plate 31, and thus the protrusion 324 extends through the notch 214 of the stop plate 212 until the hooking portions 35 of the latching member 30 contact a portion of the bracket 20 bounding the slot 213 at a distal end of the slot 213. Portions of the hooking portions 35 are positioned outside the bracket 20. Thereafter, the resilient plate 32 is restored to move away from the fixing plate 31 and abut against the bridge 215 of the bracket 20, and the engaging portion 326 of the protrusion 324 of the resilient plate 32 engages with the stop plate 212 of the bracket 20 which can block the storage device 10 moving away from the bracket 20 via the entrance. The free end of the resilient plate 32 of the latching member 30 is left outside of the bracket 20. The storage device 10 is thus fixed to the bracket 20 in a locked position.

To detach the storage device 10 from the bracket 20, the free end of the resilient plate 32 left outside of the bracket 20 is pressed toward the storage device 10, and the engaging portion 326 of the protrusion 324 of the resilient plate 32 is disengaged from the stop plate 212 of the bracket 20. The storage device 10 is pulled outward from the bracket 20, the protrusion 324 of the resilient plate 32 exits from the notch 214 of the stop plate 212, and the hooking portions 35 are disengaged from the distal end of the slot 213 of the bracket 20. The storage device 10 is thus ready to be detached from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A mounting apparatus for a storage device, the mounting apparatus comprising:
   a bracket configured for receiving the storage device, the bracket comprising a first sidewall defining a slot therein, and a stop plate extending outwardly from an end of the first sidewall adjacent the slot; and
   a latching member configured for being carried on the storage device, the latching member comprising a resilient plate receivable in the slot in the first sidewall of the bracket and movable relative to the first sidewall of the bracket in a first direction perpendicular to the first sidewall, the resilient plate having a protrusion formed thereon and engagable with the stop plate of the bracket for positioning the latching member in a second direction parallel to the first sidewall, and a hooking portion capable of engaging with a portion of the bracket bounding the slot thereof for positioning the latching member in a third direction opposite to the second direction.

2. The mounting apparatus as claimed in claim 1, wherein the stop plate defines a notch communicating with the slot of the bracket, and the resilient plate of the latching member is slidable through the notch of the stop plate before entering in the slot of the bracket.

3. The mounting apparatus as claimed in claim 2, wherein an arcuate surface is formed on the protrusion for facilitating the protrusion passing through the notch of the stop plate.

4. The mounting apparatus as claimed in claim 2, wherein an engaging portion is formed on the protrusion toward the stop plate for engaging with the stop plate after the protrusion passing through the notch of the stop plate.

5. The mounting apparatus as claimed in claim 1, wherein the latching member further comprises a fixing plate connected with the resilient plate, the fixing plate and resilient plate form an acute angle therebetween, a tab is formed on the fixing plate for engaging in a fixing hole of the storage device.

6. The mounting apparatus as claimed in claim 5, wherein the hooking portion extends from a portion where the fixing plate and the resilient plate are joined.

7. The mounting apparatus as claimed in claim 1, wherein a bridge is formed on an outside surface of the first sidewall across the slot.

8. A mounting apparatus for a storage device, the mounting apparatus comprising:
   a bracket configured for receiving the storage device, the bracket comprising a first sidewall defining a slot therein, and a stop plate formed at an end of the first sidewall adjacent the slot, the stop plate defining a notch communicating with the slot; and
   a latching member engagable with the slot of the bracket, the latching member comprising a fixing plate connectable to the storage device, and a resilient plate connected to and movable relative to the fixing plate, a protrusion formed on the resilient plate and capable of extending through the notch and engaging with the stop plate of the bracket for preventing the latching member from withdrawing from the slot of the bracket.

9. The mounting apparatus as claimed in claim 8, wherein the resilient plate is bent from an end of the fixing plate, a hooking portion extends from a portion where the fixing plate and the resilient plate meet, for engaging with the bracket adjoining the slot to stop further entering of the storage device in the bracket.

10. The mounting apparatus as claimed in claim 8, wherein an engaging portion is formed on the protrusion toward the stop plate for engaging with the stop plate.

11. The mounting apparatus as claimed in claim 8, wherein a tab is formed on the fixing plate configured for engaging in a fixing hole of the storage device.

12. The mounting apparatus as claimed in claim 8, wherein a bridge is formed on an outside surface of the first sidewall across the slot.

13. The mounting apparatus as claimed in claim 8, wherein an arcuate surface is formed on the protrusion for facilitating the protrusion passing through the notch of the stop plate.

14. The mounting apparatus as claimed in claim 8, wherein the bracket further comprising a second sidewall, a supporting portion and two support plates are formed on inside surfaces of the second sidewall and the first sidewall for supporting the storage device.

15. A mounting apparatus assembly comprising:
   a bracket comprising a pair of sidewalls with a space formed therebetween, a stop plate extending outwardly from one of the sidewalls and defining a notch;
   a storage device received in the space and sandwiched by the pair of sidewalls, at least one positioning hole being defined in one side of the storage device; and
   a latching member comprising at least one positioning pin inserted in the at least one positioning hole of the storage device and a resilient plate extending through the notch and being wavering relative to the storage device in a direction perpendicular to said one of the sidewalls, a protrusion being formed on the resilient plate and blocked by the stop plate to prevent the storage device withdrawing from the space of the bracket,
   wherein the resilient plate is capable of being pressed toward the storage device to waver inward to allow the protrusion to be released from the stop plate and be extendable through the notch, whereby the storage device and the latching member withdraw from the bracket.

16. The mounting apparatus assembly as claimed in claim 15, wherein the latching member further comprises a fixing plate connected to the resilient plate, the at least one positioning pin being stamped from the fixing plate, the resilient plate being inclined relative to said one of the sidewalls.

17. The mounting apparatus assembly as claimed in claim 16, wherein the resilient plate is bent from the fixing plate.

18. The mounting apparatus assembly as claimed in claim 16, wherein said one of the sidewalls defines a slot communicating with the notch and being covered by the resilient plate, and a hooking portion is formed at a portion where the fixing plate and the resilient plate are joined and engaged with the bracket at the slot for blocking further entering of the storage device in the bracket.

19. The mounting apparatus assembly as claimed in claim 15, wherein the protrusion forms a slant surface connected to the resilient plate for facilitating the protrusion passing through the notch when the storage device enters into the bracket.

* * * * *